US008126918B2

(12) United States Patent
Levy (10) Patent No.: US 8,126,918 B2
(45) Date of Patent: Feb. 28, 2012

(54) USING EMBEDDED DATA WITH FILE SHARING (75) Inventor: Kenneth L. Levy, Stevenson, WA (US)

(73) Assignee: Digimarc Corporatiion, Beaverton, OR (US)

( * ) Notice: Subject to any disclaimer, the term of this patent is extended or adjusted under 35 U.S.C. 154(b) by 0 days.

(21) Appl. No.: 12/835,535

(22) Filed: Jul. 13, 2010

(65) Prior Publication Data
US 2010/0281545 A1 Nov. 4, 2010

Related U.S. Application Data (60) Division of application No. 09/952,384, filed on Sep. 11, 2001, now Pat. No. 7,756,892, which is a continuation-in-part of application No. 09/620,019, filed on Jul. 20, 2000, now Pat. No. 7,689,532, and a continuation-in-part of application No. PCT/US01/22953, filed on Jul. 20, 2001.

(60) Provisional application No. 60/232,163, filed on Sep. 11, 2000, provisional application No. 60/257,822, filed on Dec. 21, 2000.

(51) Int. Cl.
*G06F 7/00* (2006.01)
*G06F 17/30* (2006.01)
(52) U.S. Cl. .................... 707/781; 707/783; 713/176
(58) Field of Classification Search .......... 707/600–831; 709/217, 219, 223–225; 713/167, 179; 715/751
See application file for complete search history.

(56) References Cited

U.S. PATENT DOCUMENTS 4,225,967 A 9/1980 Miwa et al.
(Continued)

FOREIGN PATENT DOCUMENTS

EP 0 715 246 6/1996
(Continued)

OTHER PUBLICATIONS

Boney et al., Digital watermarks for audio signals, Jun. 17-23, 1996, IEEE, 473-480.*

(Continued)

*Primary Examiner* — Jean B Fleurantin (57) ABSTRACT

Peer-to-peer file sharing is increasing in popularity on the Internet, faster than any product known in history. Although file-sharing can enable massive piracy, it has many advantages for distribution of information including scalability. Alternatively, file-sharing can be sabotaged with falsified files and used to distribute viruses. To this end, a solution that maintains the scalability of file-sharing and promotes reliability is proposed. The solution involves embedding data within the file or content and using the data to identify the content, demonstrate its completeness and lack of viruses, and verify the file can be shared. The embedded data can be checked when the file is registered with the database for sharing, and before or while the file is being uploaded and/or downloaded. Ideally, the embedded data is added at the time of creation for the file. The embedded data may include a watermark and be linked to other copy management systems, such as those proposed in DVD and SDMI. Finally, the embedded data can be used to enable purchases of files that owners do not have rights to share.

13 Claims, 4 Drawing Sheets

U.S. PATENT DOCUMENTS

| | | |
|---|---|---|
| 5,355,161 A | 10/1994 | Bird et al. |
| 5,379,345 A | 1/1995 | Greenberg |
| 5,410,598 A | 4/1995 | Shear |
| 5,450,490 A | 9/1995 | Jensen et al. |
| 5,519,778 A | 5/1996 | Leighton et al. |
| 5,526,427 A | 6/1996 | Thomas et al. |
| 5,574,962 A | 11/1996 | Fardeau et al. |
| 5,629,980 A | 5/1997 | Stefik et al. |
| 5,646,997 A | 7/1997 | Barton |
| 5,646,999 A | 7/1997 | Saito |
| 5,765,152 A | 6/1998 | Erickson |
| 5,809,317 A | 9/1998 | Kogan et al. |
| 5,841,978 A | 11/1998 | Rhoads |
| 5,845,281 A | 12/1998 | Benson et al. |
| 5,857,189 A | 1/1999 | Riddle |
| 5,860,074 A | 1/1999 | Rowe et al. |
| 5,862,260 A | 1/1999 | Rhoads |
| 5,943,422 A | 8/1999 | Van Wie et al. |
| 5,956,716 A | 9/1999 | Kenner et al. |
| 5,973,731 A | 10/1999 | Schwab |
| 5,991,876 A | 11/1999 | Johnson et al. |
| 6,115,741 A | 9/2000 | Domenikos et al. |
| 6,122,403 A | 9/2000 | Rhoads |
| 6,141,753 A | 10/2000 | Zhao et al. |
| 6,185,683 B1 | 2/2001 | Ginter et al. |
| 6,199,076 B1 | 3/2001 | Logan et al. |
| 6,209,092 B1 | 3/2001 | Linnartz |
| 6,233,684 B1 | 5/2001 | Stefik et al. |
| 6,260,040 B1 | 7/2001 | Kauffman et al. |
| 6,366,907 B1 | 4/2002 | Fanning |
| 6,466,670 B1 | 10/2002 | Tsuria et al. |
| 6,477,707 B1 | 11/2002 | King et al. |
| 6,490,355 B1 | 12/2002 | Epstein |
| 6,499,058 B1 | 12/2002 | Hozumi |
| 6,505,160 B1 | 1/2003 | Levy et al. |
| 6,519,352 B2 | 2/2003 | Rhoads |
| 6,587,821 B1 | 7/2003 | Rhoads |
| 6,614,914 B1 | 9/2003 | Rhoads et al. |
| 6,647,548 B1 | 11/2003 | Lu et al. |
| 6,697,944 B1 | 2/2004 | Jones |
| 6,768,808 B2 | 7/2004 | Rhoads |
| 6,807,534 B1 | 10/2004 | Erickson |
| 6,829,368 B2 | 12/2004 | Meyer et al. |
| 6,928,545 B1 | 8/2005 | Litai |
| 6,947,909 B1 | 9/2005 | Hoke |
| 6,965,683 B2 | 11/2005 | Hein, III |
| 6,968,564 B1 | 11/2005 | Srinivasan |
| 6,978,370 B1 | 12/2005 | Kocher |
| 7,123,740 B2 | 10/2006 | McKinley |
| 7,142,691 B2 | 11/2006 | Levy |
| 7,213,005 B2 | 5/2007 | Mourad |
| 7,233,948 B1 | 6/2007 | Shamoon |
| 7,369,676 B2 | 5/2008 | Hein, III |
| 7,421,723 B2 | 9/2008 | Harkness et al. |
| 7,689,532 B1 | 3/2010 | Levy |
| 7,747,037 B2 | 6/2010 | Hein, III |
| 7,756,892 B2 | 7/2010 | Levy |
| 2001/0017885 A1 | 8/2001 | Asai et al. |
| 2001/0018742 A1 | 8/2001 | Hirai |
| 2001/0041061 A1 | 11/2001 | Nakagawa |
| 2001/0042043 A1 | 11/2001 | Shear |
| 2001/0049788 A1 | 12/2001 | Shur |
| 2001/0051996 A1 | 12/2001 | Cooper et al. |
| 2002/0023058 A1 | 2/2002 | Taniguchi et al. |
| 2002/0033844 A1 | 3/2002 | Levy et al. |
| 2002/0046178 A1 | 4/2002 | Morito et al. |
| 2002/0049679 A1 | 4/2002 | Russell et al. |
| 2002/0065832 A1 | 5/2002 | Mack |
| 2002/0069370 A1 | 6/2002 | Mack |
| 2002/0071556 A1 | 6/2002 | Moskowitz et al. |
| 2002/0087885 A1 | 7/2002 | Peled |
| 2002/0163481 A1 | 11/2002 | Takamine |
| 2003/0012548 A1 | 1/2003 | Levy et al. |
| 2005/0056700 A1 | 3/2005 | McKinley et al. |
| 2005/0111723 A1 | 5/2005 | Hannigan et al. |
| 2007/0177761 A1 | 8/2007 | Levy |
| 2007/0183623 A1 | 8/2007 | McKinley et al. |
| 2008/0049971 A1 | 2/2008 | Ramos et al. |
| 2008/0052783 A1 | 2/2008 | Levy |
| 2009/0138484 A1 | 5/2009 | Ramos et al. |
| 2009/0158318 A1 | 6/2009 | Levy |
| 2010/0281545 A1 | 11/2010 | Levy |

FOREIGN PATENT DOCUMENTS

| | | |
|---|---|---|
| JP | 09-160899 | 6/1997 |
| JP | 11-088852 | 3/1999 |
| JP | 11-260045 | 9/1999 |
| JP | 2000-076789 | 3/2000 |
| JP | 2000-155718 | 6/2000 |
| KR | 10-2000-0018052 | 4/2000 |
| WO | WO96/31049 | 10/1996 |
| WO | WO 00/70585 | 11/2000 |
| WO | WO 01/16671 | 3/2001 |
| WO | WO 01/05075 | 11/2001 |
| WO | WO 02/07150 | 1/2002 |

OTHER PUBLICATIONS

Ruanaidh et al., Watermarking digital images for copyright protection, Aug. 1996, IEEE, vol. 143, Issue:4, 250-256.*

Jian Zhao, A WWW service to embed and prove digital copyright watermarks, May 1996, Proceedings of ECMA Services and Techniques, Louvain la Neuve, Belgium, 695-709.

Bartolini et al., Electronic copyright management systems: requirements, players and technologies, 1999, IEEE, 896-898.

Schneck et al., Persistent access control to prevent piracy of digital information, Jul. 1999, IEEE, 1239-1250.

U.S. Appl. No. 09/404,291, filed Sep. 23, 1999, Levy.

U.S. Appl. No. 09/404,292, filed Sep. 23, 1999, Levy.

U.S. Appl. No. 09/571,422, filed May 15, 2000, Rhoads et al.

U.S. Appl. No. 09/574,726, filed May 18, 2000, Rhoads et al.

U.S. Appl. No. 09/952,384, filed Sep. 11, 2001, Levy.

Zhao, "WWW Copyright Labeling & Verification Service," (URL:http://sagittarius.igd.fhg.de:64325) Fraunhofer-IGD, Wilhelminenstr.7, D-64283 Darmstadt, 1 page.

U.S. Appl. No. 09/503,881, filed Feb. 14, 2000, Rhoads et al.

U.S. Appl. No. 09/563,664, filed May 2, 2000, Levy et al.

U.S. Appl. No. 09/620,019, filed Jul. 20, 2000, Levy.

Zhao, "A WWW Service to Embed and Prove Digital Copyright Watermarks," In Proc. of the European Conf. On Multimedia Applications, Services and Techniques, Louvain-La-Neuve, Belgium, May 1996, 14 pages.

Examiner's Report in EP01954827.0 dated Jan. 14, 2005, 4 pages.

EP01954827.0, Summons to Attend Oral Proceedings, dated Sep. 20, 2005, 4 pages.

EP01954827.0, Response to EPO with revised claims, dated Jul. 22, 2005.

EP01954827.0, Written Submissions with Main Request and Auxiliary Request, including Auxiliary Request Claims, dated Dec. 23, 2005, 7 pages.

EP01954827.0, Search report dated Sep. 3, 2004, 4 pages.

EP01954827.0, The minutes of the oral proceedings in accordance with Rule 76(4) EPC, dated Nov. 23, 2006, 9 pages.

EP01954827.0, Communication Under Rule 51(4) EPC informing of intention to grant a European patent, dated Nov. 27, 2006, 39 pages.

Korean Application No. 1020037000844, Notice of Preliminary Rejection mailed Oct. 29, 2007, 12 pages.

U.S. Appl. No. 09/636,102, filed Aug. 10, 2000, Ramos et al.

Decision of Rejection on Japanese Application 2002-514579, mailed Sep. 9, 2011 (English translation included).

* cited by examiner

Fig. 4

ID Format

| Copyright (1-3 bits) | Date (16 bits) | Unique Song ID (24-32 bits) | Retail Channel (12-16 bits) |
|---|---|---|---|

Database Format

| | Song Info | | | | Connected URLs | | | | |
|---|---|---|---|---|---|---|---|---|---|
| ID | Song Title | Artist | Label | Date © | Song-writer | Artist | Label | Retail channel | Default |

USING EMBEDDED DATA WITH FILE SHARING

RELATED APPLICATION DATA

This application is a division of application Ser. No. 09/952,384, filed Sep. 11, 2001 (now U.S. Pat. No. 7,756, 892), which:

(a) is a continuation in part of application Ser. No. 09/620, 019, filed Jul. 20, 2000 (now U.S. Pat. No. 7,689,532);

(b) is a continuation in part of PCT application PCT/US01/22953, filed Jul. 20, 2001; and (c) claims priority benefit to provisional patent applications 60/232,163, filed Sep. 11, 2000, and 60/257,822, filed Dec. 21, 2000.

These patent applications are hereby incorporated by reference.

This application also relates to U.S. Pat. Nos. 7,055,034 and 7,197,156, which are incorporated herein by reference.

TECHNICAL FIELD

The invention relates to file sharing systems for computer networks such as the Internet, and specifically relates to using embedded data in files to enhance such systems.

BACKGROUND AND SUMMARY

With the explosive growth of the Internet, file-sharing programs have evolved. One popular file sharing program is known as Napster, with a user base that has grown to between 10 and 20 million users in 1 year. This is one of the fastest growing products today. Currently, scores of music files can be found from Napster's database of current online users, and downloaded from another user's computer, in a data transfer scheme known as peer-to-peer file sharing. File-sharing is easily extended to all content, such as done with Scour.com.

In the Napster system, web site servers store a database of directories of the digital music libraries on the hard drives of thousands of registered users. The digital files of the songs themselves remain on the users' hard drives. If a user wants a particular song title, he logs onto the Napster web site and types in a search query for the title. Client software on the user's computer connects to the Napster server and receives a list of active users who have the requested file on their computer. In response to selecting a handle name, the client software opens a link between the user's computer and the computer of the selected user, and the client software executing on the two computers transfer the requested file.

Many new file-sharing systems are evolving in which the database is dynamic and not stored on a central server. One example of software with a dynamic database is known as Gnutella. Initially, when a user logs on to the Gnutella network, the user downloads client software from a Gnutella website. Next, the user types in the Internet address of an established Gnutella user (e.g., from a listing available at the web site). The client software then transmits a signal on the network that informs other computers in the Gnutella file sharing network of its network address and connection status. Once a link with the other computer is secure, the other computer informs other computers of the Gnutella network that it has encountered in previous sessions of the user's presence (e.g., address and connection status).

After this initial session, the client software stores the addresses of other computers that it has encountered in the Gnutella network. When the client software is loaded, it recalls these addresses and attempts to reconnect with the other computers located at these addresses in the Gnutella network. The Gnutella software enables users to exchange many types of files. It enables users to issue a search request for files containing a desired text string. In response, the Gnutella clients connected with the user's computer search their respective hard drives for files satisfying the query. The client on the user's computer receives the results (e.g., files and corresponding addresses) and displays a list of them. By clicking on a file item in the user interface, the user instructs the client software to transfer the selected file.

In another file sharing system known as Freenet, the identity of the person downloading and uploading the files can be kept secret. Alternatively, the files could be stored on a central server, but uploaded by users such that the central server does not know the origin or true content of the files.

Unfortunately, the file-sharing methodology also allows massive piracy of any content, such as text, music, video, software, and so on. However, due to the scalability and freedom of distribution with file-sharing, it provides a powerful tool to share information. As such, there is a need for technology that facilitates and enhances authorized file sharing while respecting copyrights.

A few examples of the benefits of file-sharing follow. A file sharing system allows unknown artists to obtain inexpensive and worldwide distribution of their creative works, such as songs, images, writings, etc. As files become more popular, they appear on more of the users' computers; thus, inherently providing scalability. In other words, there are more places from which to download the file and most likely several files exist in close proximity to the downloading computer, thus improving efficiency. In addition, anonymous file-sharing, like FreeNet, foster political debate in places around the world where such debate might trigger reprisals from the government.

Current attempts to curb unauthorized file sharing include enforcement of copyright laws and use of files with content bombs. The current legal enforcement efforts allege that uses of file sharing systems violate copyright laws. Content bombs involve placing files that appear to be the correct content, but contain alternative content or viruses. For example, a MP3 file can have the middle replaced with someone saying "do not copy songs" instead of the desired music. Neither of these solutions will help the Internet grow and improve the quality of life, worldwide.

Current copy management systems allow copying, but block rendering on equipment if the person does not have rights, where rendering only refers to reading a text file, seeing an image, watching a movie, listening to an audio file, smelling a smell file, or executing a software program. Although this can limit piracy within a file-sharing system, it does not improve the system for the user. In fact, this rendering based method of copy protection detracts from the system. This detraction stems from the fact that current copy control systems are implemented on the user's computer at the time of importing into the secure system, rendering, or moving to a portable rendering device or media, as described in the Secure Digital Music Initiative's specifications version 1 (available at http://www.sdmi.org, and incorporated by reference). In other words, current copy control systems do not check rights at the time of copying or transfer between computers. For example, the user downloads the protected file, and then finds out that he/she cannot render the file (i.e. play the song). In addition, the user does not know if the file is the correct file or complete until after downloading and attempting to render the file. More specifically, the file is encrypted by a key related to an unique identifier within the user's computer; thus, after copying to a new computer, the file cannot be decrypted. In addition, watermarks can only be used after the file has been decrypted, or designed to screen open (i.e. decrypted) content for importation into the user's secure management system after the file has been copied to their computer.

Another approach would be to use a database lookup to determine whether the content is allowed to be shared. For example, music in the MP3 file format can be determined whether it can be shared by the ID3 song title tag. However, this solution does not scale. Specifically, every downloaded file needs to access and search this central database, and this database's access does not improve as the file becomes more popular. In addition, the approach can be bypassed by changing the file's title tag or filename, although this makes searching more difficult.

A desirable solution includes embedding data throughout the content in which the embedded data has any of the following roles. The embedded data can have an identifier that has many uses, such as identifying the file as the content that the user desires, allowing the file to be tracked for forensic or accounting purposes, and connecting the user back to the owner and/or creator of the file. The embedded data can be analyzed in terms of continuity throughout the file to quickly demonstrate that the file is complete and not modified by undesirable content or viruses. An additional role is to identify the content as something that is allowed to be shared, or used to determine the level or type of sharing allowed, such as for subscription users only.

The embedded data may exist in the header or footer of the file, throughout the file as an out-of-band signal, such as within a frame header, or embedded in the content while being minimally perceived, most importantly without disturbing its function, also known as a watermark.

In the utilization of this embedded data, the computer from which the content to be downloaded (i.e. the uploading computer) can check to make sure the content is appropriate to be uploaded when the files (e.g., music files) on this computer are added to the central database and/or when the content is requested. Similarly, the downloading computer can also check that the requested content is appropriate before, after or during the downloading process. An appropriate file can be defined as any of the following: the content is allowed to be shared, i.e. it is not copyright material, the file is the correct content, and that the content is complete and does not contain any viruses.

DETAILED DESCRIPTION

Figures 1, 2, 3:
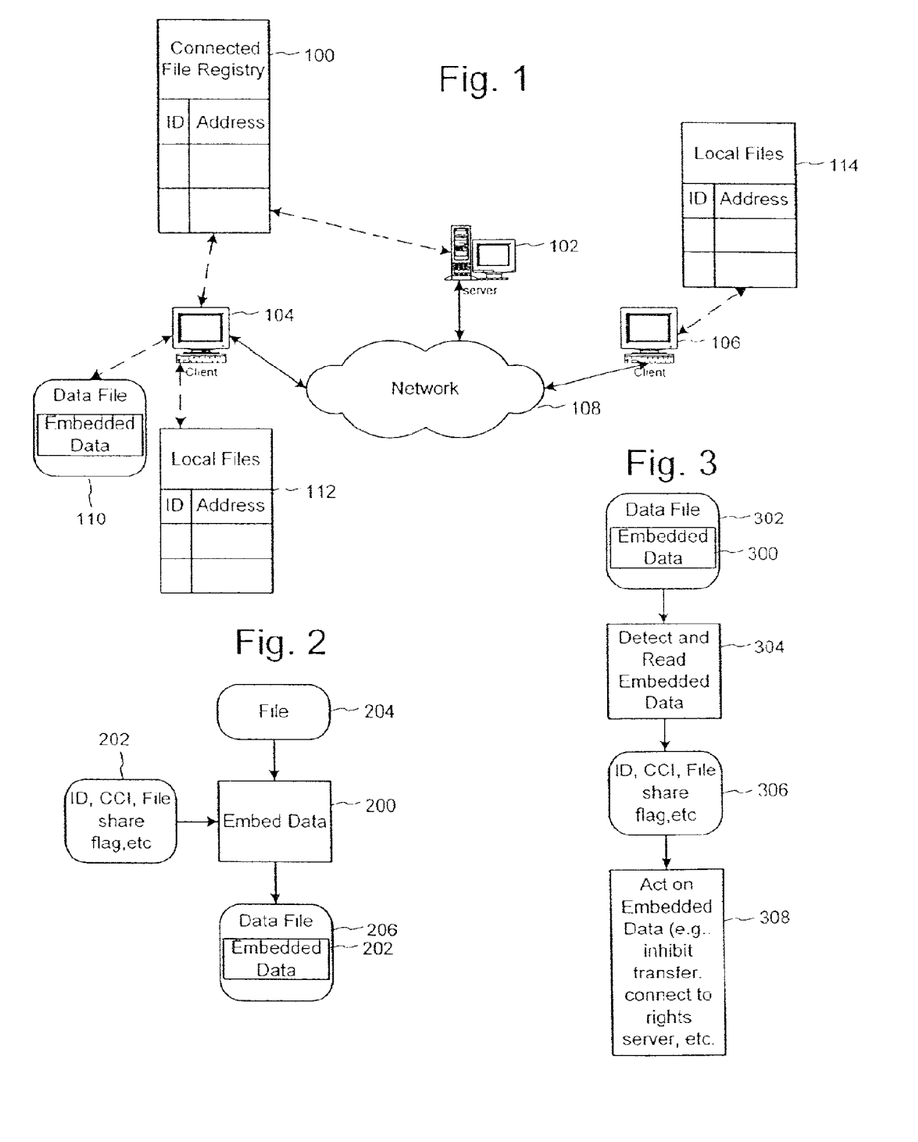
FIG. 1 is an overview of peer-to-peer file sharing system demonstrating locations at which embedded data can be used to control file-sharing.
FIG. 2 is a flowchart of an embedding process.
FIG. 3 is a flowchart of a detecting process.

The following sections describe systems and methods for using auxiliary data embedded in files to enhance file sharing systems. FIG. 1 depicts an example of a file sharing system for a computer network like the Internet. The solution described below uses data embedded in a file to identify a file as having content desired for downloading, to verify that the content of the file is complete and free of viruses, and to allow the file to be shared among users' computers at the user's share level. In many applications, an embedding process encodes auxiliary data in the file during creation, but it may also be embedded at a later time. For example, the file may be embedded (or re-embedded) as part of a file transfer process or electronic transaction where a user is granted usage rights for the file.

FIG. 2 depicts an embedding process for adding auxiliary data to files in a file sharing system. A data embedding process 200 (e.g., steganographic encoder, file header encoder, data frame header encoder, etc.) embeds auxiliary data 202 in a file 204 to create a data file 206 including the embedded data 202. The file may then be distributed in a file sharing system comprising a number of computers or other devices in communication with each over via a network. The auxiliary data embedded in the file is used to manage file sharing operations, and to enhance the user's experience.

Types of Embedded Data

The embedded data can be placed in the header or footer of the file, throughout the file such as within frame headers, or hidden in the content itself using steganographic encoding technology such as digital watermarking. The file may contain any combination of text, audio, video, images and software, in compressed or uncompressed format.

Auxiliary data used to manage sharing of a file may be embedded in headers and footers of the file for each type. When the data is to be embedded throughout the file, the file can be broken into frames of known size, with a header for each frame including space for embedded data. For MPEG compressed audio and video, these frames already exist. The embedded data can be hidden in copyright, private or auxiliary bits. The data embedded in frame headers can be modified by the audio in any frame and/or encrypted (defined as dynamic locking in U.S. Pat. No. 7,055,034, already incorporated by reference) to improve its robustness to duplication in another content file, a content bomb, or virus.

With respect to watermarking, there are many known techniques for embedding data within software, image, audio, video, and text in the state of the art, and new techniques will evolve, especially for software. Examples of steganographic encoding and decoding technologies are described in U.S. Pat. Nos. 5,862,260 and 6,614,914. The watermark may exist only in one place in the content, several places in the content, or continuously throughout the content. For example, in an audio file, the watermark may be repeated in temporal segments of the audio track. In a still image, the watermark may be repeated in spatial segments of the image. In video, the watermark may be repeated in temporal or spatial segments of the video signal.

Roles of Embedded Data

The embedded data may include an identifier (ID) that serves as an index to an entry in a searchable database that describes or otherwise identifies the content of the file. For example, the database can include elements, where each element comprises an ID, song title, album (or CD) title, release year, and artist name. This database can be indexed by any of these elements, thus improving automated searching capabilities. Specifically, rather than needing to search for "Help and Beatles", "The Beatles—Help!", and so on, a unique ID can be used in a search query to identify The Beatles' song Help, and different IDs may be used for different releases.

The user, via an automated search program, only needs to submit a search query including that ID. When searching, the user may be presented with a drop down menu of titles of files from the database that satisfy the search query. The search program automatically knows the ID from the database so that the correct file can be found and downloaded from a computer at an address associated with that file in the database. In addition, these IDs could help music be searched by year, which is desirable to many people who want to hear music from their high school or college days.

In addition to facilitating automated searches for content in files, the ID may also be used to track these files. For example, the file transfer system can add the ID of a file to an event log when the file is transferred (e.g., downloaded, uploaded, etc.). The specific components of the file transfer system involved in the event logging process may vary with the implementation. Also, the time at which the event is triggered and logged may also vary.

The client system responsible for sending a file may issue and log an event, and either store the log locally, and/or send it to a central or distributed database for communication to other systems. The client system that receives the file may perform similar event logging actions. Additionally, if a server system is involved in a file transfer, it may also perform similar event logging actions. For example, the server may transfer the file, or facilitate the transfer between two clients, and as part of this operation, log an event of the operation including the file ID, the type of event, etc. In distributed systems where no central server is involved, the event logs can be stored on computers in the file sharing network (or a subset of the computers), and composite event logs can be compiled by having the computers broadcast their event logs to each other. Each computer, in this approach, could maintain a copy of the event log, which is synchronized upon each broadcast operation. The log could be used to account for all file transfers, and be used to properly pay the rights holders.

Another use for the embedded data when it contains a unique ID, such as unique to the retailer, song, artist and/or rights holder, is to link the consumer to more information, such as information about the retailer, song, artist and/or rights holder. The ID could be used to link to the retailer's web site, where the consumer can find additional songs in the same genre, year and by the same artist. Or, the ID could be used to link to the artist's web site where the consumer finds additional information about the artist and song, and can locate other songs by the artist. Or, the ID could be used to link back to the rights owner, such as the record label where the consumer can find additional information and music.

This connected content link could be displayed by the file sharing application during the downloading process. This provides the user with benefits of not wasting time during the downloading process, and gaining access to more music and information. The file sharing company can use this process to increase the revenues generated from the file sharing system through deals with the companies who gain access to the user via the connected content links.

The unique ID could be generated from the content, such as done with CDDB, which generates an ID from a CD's table of contents (TOC), and then steganographically embedded into the content. Alternatively, the unique ID may not be embedded but inherently linked to the content via a hash or fingerprint function that turns some or all of the content into a few bits of data. The number of bits allowed determines the likelihood that different files transform into the same number of bits. However, even with as few as 32 bits, this is unlikely. In addition, this is less likely if the hash function prioritizes parts of the data that are most perceptually relevant. This process is sometimes referred to as fingerprinting.

The embedded data, when continuously embedded throughout the content, can improve the reliability of the content by, for example, demonstrating that the content is complete and has no viruses. One way to make the embedded data continuous is to insert it in periodically spaced frame headers, or steganographically encode it at locations spread throughout the file.

A person trying to sabotage the file-sharing system can try to replicate the embedded data through a content bomb (such as audio repetitively saying "do not copy") or virus to fool the system. Thus, the harder it is to duplicate the embedded data, the more reliable the system is. When trying to resist duplication, it is advantageous to encrypt the embedded data payload, thus making it harder to duplicate. In addition, the embedded data payload can be modified by the content to improve resistance to duplication. Finally, the embedded data can be modified by the content and then encrypted for more secure applications. The above three robustness methods are labeled dynamic locking and disclosed in patent application Ser. No. 09/404,291, already incorporated by reference. When the embedded data is a watermark, meaning that it is steganographically embedded within the content and not just as auxiliary data in each frame, it is usually inherently robust to duplication because many watermarks use secret keys that are required to detect the watermark and read the information carried in it. One form of key is a pseudo-random noise (PN) sequence used as a carrier to embed, detect, and read the watermark. In particular, a spreading function is used to modulate the PN sequence with the watermark message. The resulting signal is then embedded into the host data (e.g., perceptual or transform domain data) using an embedding function. The embedding function modifies the host signal such that it makes subtle changes corresponding to the message signal. Preferably, these changes are statistically imperceptible to humans yet discernable in an automated steganographic decoding process. Encryption and changing the watermark message or PN sequence adaptively based on the content can improve the robustness of the watermark to duplication.

Alternatively, if the embedded data is generated from the content, the embedded data is inherently linked to the content and is difficult to duplicate in a virus or content bomb. For example, pseudo-randomly chosen frames can be hashed into a few data bits that can be embedded in other pseudo-randomly chosen frames. Thus, without knowledge of the pseudo-random sequence (i.e. key) used to choose the frames and the hash function, the hacker cannot duplicate the embedded data.

Importantly, header and footer structures should be of known size or protected so a hacker cannot slip a virus into the header or footer.

The embedded data can also demonstrate that the file is allowed to be shared, which means its owner has authorized copying (i.e. sharing) rights. The watermark message may include standard copy control information such as two message bits to encode copy permission states of "no more copy," "copy once" and "copy freely." In addition, only one bit can be used, thus indicating whether or not sharing, is allowed.

The copyright can be linked to other copy management systems. For example, according to the DVD-Audio specification (available at http://www.dvdforum.org) and the Portable Device Specification of the Secure Digital Music Initiative (available at http://www.sdmi.org), audio may be watermarked with copy control information. This information may automatically be passed along if encoded within a watermark robust enough to survive the compression used in most file-sharing systems. Alternatively, the watermark can be read and re-embedded as embedded data, possibly another type of watermark (as discussed in U.S. Pat. No. 7,197,156, already incorporated by reference).

In addition, the copyright data can provide more information than just copy or not. For example, the bits may inform file sharing software, system or device that this file can be shared by subscription users, but not free users. Or, it can inform the level or type of subscription which allows sharing of the file. Specifically, subscription users who pay per month can share files that a free user cannot share. With music sharing, a popular band may allow only subscription users (or possibly users with an expanded subscription) to share their file so that they can earn revenue directly from the file. However, a new band may allow their song to be shared by all users.

Embedded Data Payload

The simplest form of the embedded data is a payload of one bit determining whether or not the file can be copied. A better payload is one with two bits for copy control and more bits, such as 32 bits, for a unique identifier that can be used to verify that the file contains the correct content. Note that demonstrating the file is complete does not depend upon the payload, but upon completeness of embedded data throughout the content. A decoding process can verify whether the file is complete by determining whether or not the embedded data is present at predetermined intervals or segments of the content. Finally, the payload can have a payload type, such as 8 bits, and then more bits, like 32 bits, of information that depends upon the document type and probably includes copy control and an identification section.

One way to verify that a file is complete without spreading embedded data throughout the file is to embed a hash of the file data at one or more selected locations within the file. The completeness of the file is checked by a program or device that re-computes the hash from the file and compares it with the previously computed hash which is embedded in the file.

When the payload is to be continuously embedded with dynamic locking and it contains only a few bits, such as 1 bit, a system designer can easily convert the payload into a multi-bit payload for more secure dynamic locking. For example, the 1 bit payload can be represented by a 16-bit PN sequence, where a "1" is the 16-bit PN sequence and a "0" is the 16-bit complement, embedded over and over again.

A further concept is the integration of watermark data into peer-to-peer (e.g., Napster-like) systems.

Figure 4:
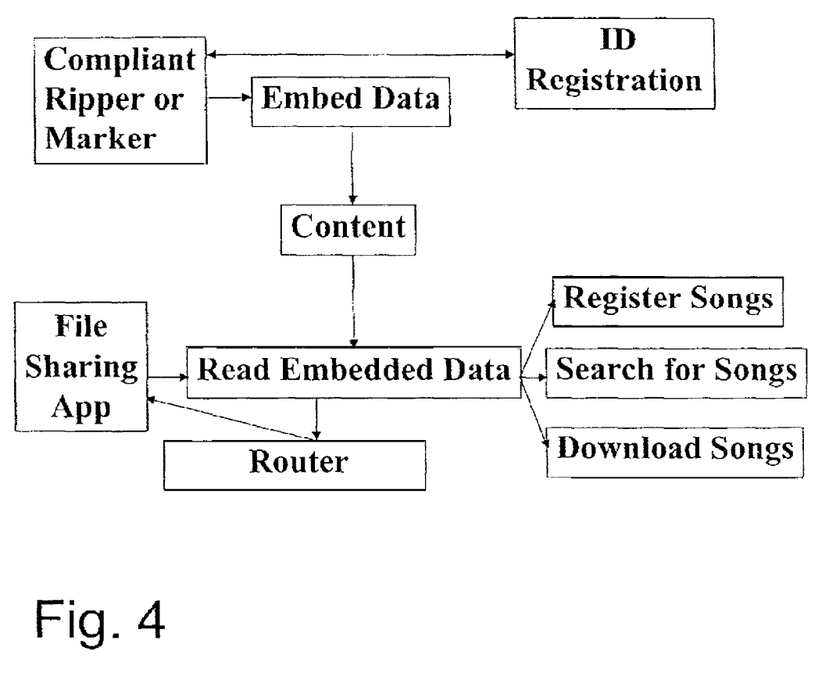
FIG. 4 is a diagram of a file sharing system using embedded data.

Referring to FIG. 4, the top 3 boxes correspond to an embedding part of the system. The embedded bits may fall into various classes, e.g:

Copyright/Subscription level bits or protocol (e.g., 1-3 bits)
  In a free subscription system, these bits can provide copyright notification and control. They may also provide preview and/or stream capabilities, permitting the viewer to buy a copy of the content.
  In a pay subscription system, these bits can be used to track royalty payments (e.g., when including Unique ID bits)
Date stamp bits (e.g., 16 bits)
  Allows content to enter different parts (tiers or levels) of the file-sharing system over time, so as to maximize profitability (e.g., as done with video releases)
Unique ID bits (payload) per song (e.g., 24-32 bits)
  Connected content and e-commerce opportunities
  Buy paraphernalia and other similar music
  More information about artist
  Improved searching because the unique ID uniquely identifies the content
Retail Channel bits (e.g., 12-16 bits)
  Optionally connect to same retail channel from which the song was originally purchased These bits are desirably embedded repetitively and continuously throughout a song. The bit payload at the beginning of a song may be different from that at the end (either in the specified bits, or others), permitting the watermark to serve as a receipt of complete downloading. Such continuous embedding is not required for all applications.

Figure 5:
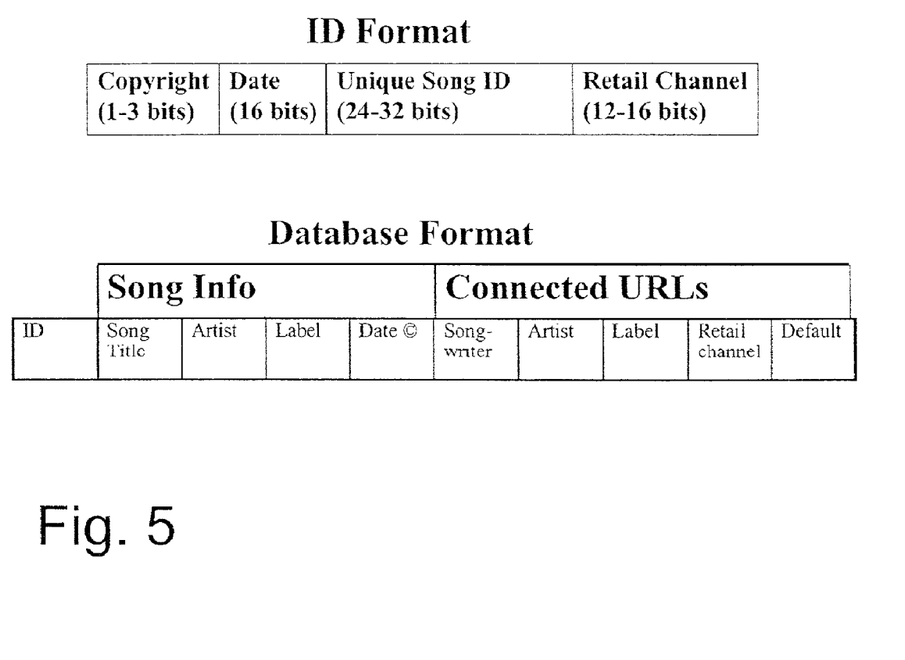
FIG. 5 is a diagram of an embedded data format and corresponding database format.

This watermark payload, and the format of an associated database record, is shown in FIG. 5.

Figure 6:
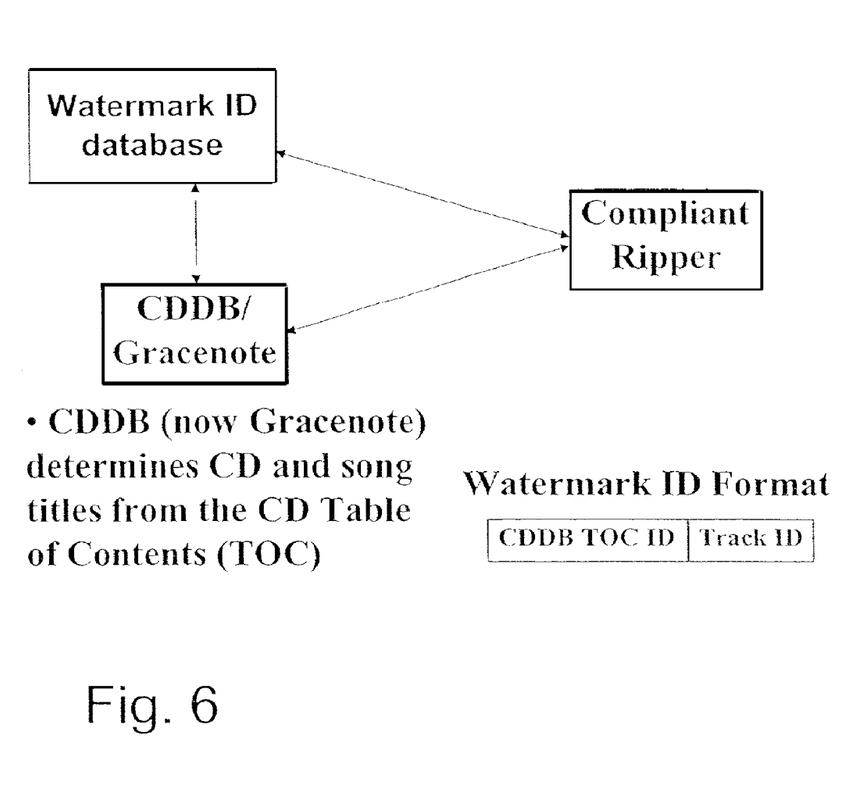
FIG. 6 is a diagram illustrating an arrangement for generating a unique ID based on content.

The Unique ID may be automatically generated based on the content (e.g., fingerprint-like), or it can be specified by the owner of the content. The CDDB database (now termed Gracenote) can provide CD and song titles from the Table of Contents data read from a CD, and this information can be used in generating an ID. FIG. 6 shows such an arrangement. In this arrangement, the ripper reads song tracks from a CD as well as table of contents data. From the information on the CD, it forms an index into the CDDB database. Using information from the database, the ripper forms an ID to be embedded in a song track. The watermark payload may include, for example, a CDDB TOC ID, used to index information in the CDDB database, and a track ID to identify the track as well as index information in the watermark ID database and/or in the CDDB database.

Today, MP3 content owners, such as Emusic.com, and MP3.com can embed their songs with copyright bits that control file sharing without audibility issues, and can additionally embed unique IDs that can be used to connect content back to the retailers and the artist's web site for increased e-commerce options.

While watermarked data is preferred because it is format independent, header data and the like can also be employed. The latter, for example, could be used by content owners to embed data in each frame header of MP3 files.

General Utilization of Embedded Data for File-Sharing

Before using the embedded data in the file-sharing system, the embedded data has to be added to the content, as shown in FIG. 2. Usually, the embedded data will be added at the time of creation or purchase. Minimally, the embedded data includes a copy control bit, possibly repeated throughout the file. When repeated, the embedded data also demonstrates file continuity and completeness. Additionally, the embedded data may include an ID to identify the content.

Alternatively, the content can be watermarked when created or manufactured for public release. For perceptual content such as images, audio or video, the watermark is designed to survive the compression, such as used in a JPEG or MPEG format. Or if not made to survive certain types of compression or other processing, the watermark can be read and re-embedded in the compressed content. An advantage of the watermark is that it survives typical file conversion processes such as ripping content from a CD to another electronic file format, usually a compressed format. A related benefit is that the watermark obviates the need for the file conversion program or device to be responsible for ensuring that the embedded data remains with the content. In other words, the ripper does not need to have a decoder for the embedded data and does not need to act on embedded data.

The system, as shown in FIG. 1, may be implemented in three principal network architectures:

1. A client server model with a central database 100, like the Napster file sharing system. In this case, the database 100 is centralized on a server 102 or group of servers managed by one entity. To the clients (e.g., 104, 106) of the system, the server 102 presents a common interface for accessing and searching the database 100 and getting address information of desired files to facilitate file transfer between clients.

2. A distributed client model with a distributed database, like the Gnutella file sharing system. In this case, the database 100 is distributed among several different computers (e.g., 104, 106) on a network 108 and several copies of similar but slightly different databases may co-exist. Each database may be replicated on each client or on other computers on the network that the clients may access via conventional network communication protocols like TCP/IP and HTTP. When any registered user makes a change to one copy of the database, other copies of the distributed database may be updated using database synchronization.

3. A central server model where users upload the files to a central server 102 for downloading from there, without the server knowing what content is in the file. In other words, the central server is not moderated. The central server contains a database 100 of the files that have been uploaded and are available for downloading.

In all three architectures, in general, a client system downloads the file from another place (e.g., client 106 downloads a file 110 from client 104). In architectures (1) and (2), the other place is another user's computer, whereas in case (3) the other place is a central server. In each case, the database is searchable via an automated search program.

FIG. 3 depicts a process for decoding embedded data from files in the file sharing system. For optimal scalability, the embedded data 300 is detected and read from a data file 302, by an embedded data decoding process 304 in the user's computer and not the network server. The decoding process, which is preferably integrated into client software of the file sharing system, returns the embedded data 306. The file sharing software in the client (and potentially on a server) then acts on the embedded data as depicted in block 308. The user's computer can be the uploading or downloading computer, or both, in architectures (1) and (2), whereas the user's computer is the downloading computer in architecture (3).

Alternatively, when registering files and a network address with the file-sharing database, the user's file sharing software can scan files for the embedded data to enable proper registration. Note that each user is provided with client software or firmware, which is provided electronically or on a portable storage device like an optical disk.

The database, for any of the above architectures, is searchable via an automated search program and maintains records of the files (MP3 files, software, documents, images, video, etc.) available for sharing from each registered user. In addition, each user may maintain a local database 112, 114 of files available for sharing, including file identifiers, other file related metadata, and address information indicating where the file resides on the user's computer system (104, 106). When the user connects to the file sharing system (e.g., connects to the network), this information is added to the database of files available for sharing (e.g., connected to file registry 100).

Both systems have a mechanism for communicating connectivity status of clients. In particular, the connectivity status indicates which clients are currently connected to the network, and are available to transfer registered files. The connectivity status information may be maintained in the same or a different database as the one that maintains records of files available for transfer along with the addresses of the clients where those files are available. The example shown in FIG. 1 shows that a database, called the connected file registry, stores identifiers and possibly other information about files available for sharing and connectivity information such as the addresses of the computers where the files reside.

All three architectures include a client system (104, 106) that acts as the interface to end users, and maintains the end user's copy of files available for sharing in the network architecture. The client system is capable of directly or indirectly communicating with the database 100 and is capable of obtaining connectivity status.

In one preferred embodiment, the content files such as audio, image and video files, have been marked with embedded data that conveys any or all of the following: file identification, file status, such as complete and virus free, and copy control information within the network architecture. The clients have an embedded data decoder that screens files for the presence of embedded data, and if found, determines whether the embedded data enables the desired action. Before sending or receiving a file as part of a file sharing process in the network architecture, the client checks the file transfer status and determines whether or not the file can and is the correct and complete file to be transferred.

One enhancement is to add a user interface to the client that informs the user of file transfer rights, and gives the user the opportunity to get rights that he or she desires. One way to get the rights is to connect to another computer and purchase a copy of the file with the desired file transfer rights. One way to enable this connection is to include an identifier (e.g., address, URL, name, etc.) or index to an identifier in the embedded data that instructs or otherwise enables the client to establish network communication with an e-commerce or rights transaction server. The purchased file may be transferred to the client electronically or physically shipped on packaged media, such as an optical disk, memory card, etc.

The user interface may also enable the user to get additional information about a file (e.g., a generic or customized copyright notice or other metadata) and to access another server that provides electronic purchase opportunities. For example, the user interface may facilitate a link to a server on the network that enables the user to buy a file of interest or related files. For music applications, the user can buy a music track or set of tracks, concert tickets, etc. via an electronic transaction between the client and an e-commerce server on the Internet. This link can be shown during the downloading process, with the advantage of allowing the user to browse during the downloading process.

Another way is to connect to another computer and purchase the rights, which in turn, are updated in the file by changing the embedded data in some fashion. The updated rights may be affected by encoding more embedded data, such as another watermark, or altering the existing embedded data, such as by removing it. Content providers or distributors pay the provider of the embedded data technology to encode files. In one embodiment, the files are watermarked at their time of creation. In addition, the content providers or distributors pay the provider of the embedded data technology per transaction when users purchase enhanced rights. There are a number of ways to track these transactions. The client software that performs encoding or decoding of the embedded data can keep a log of transactions and add the log to a central or distributed database of transactions. Alternatively, the transaction server that communicates the enhanced rights to the client can log the transaction event in a similar fashion.

Finally, if no embedded data exists, it is up to the client file sharing application to decide what to do.

On the user side, when the user registers a song on the hard drive, the user's file-sharing application tells the central database:

Song is reliable if embedded data exists and is continuous
Copyright and subscription level of song
Song title, album, artist, etc., optionally obtained from clearinghouse web server In the future, look for watermark and trans-watermark or embedded data in frame header When the user searches for songs, the database can quickly
 Display "reliable" icon for watermarked songs (increasing the user's confidence in safety)
 Display Label (helps determine if good song, especially for smaller or classical labels)
 Determine which songs the user is allowed to access, and which are available for purchase (display options set by user; user not confused by seeing files they cannot access)

When the user downloads a song, the user's file-sharing application can
 Double check that the embedded data is continuous, if supposed to be present (drastically reducing sabotage by substituting songs on uploading computers)
 Double check that the embedded data allows sharing
 Check that complete file is downloaded (and optionally providing download receipt)
 Use the identification and clearinghouse web server to track songs for rights organizations, and provide additional e-commerce opportunities from the original retailer and artist's web site The foregoing arrangement employs a remote database, or other data repository, to store the ancillary information.

The following section details particular watermark-related actions that can be utilized when distributing digital content.

1. Label content with watermark

2. Use watermarked label to trigger automated purchase and file transfer operation from source to user's machine, digital locker, etc. (e.g., press button while listening to song to trigger transaction), may include some notions of digital money transaction (see, e.g., application Ser. No. 09/337,590).

3. Embed label in an automated fashion on users' machines: search for content on drive, look up ID from local or network database (with either fingerprint or TOC type indicators), embed ID into content 4. Embed label at time of rip, where the file transfer "client" (which acts as both client and server) includes read/write functionality. The write function can be used for supplementing previous embedding by content owner or ripper software (see, e.g., U.S. Pat. Nos. 6,505,160 and 6,970,886). During download, adding the unique ID from a fingerprint and secondary second database.

5. Check file for proper naming, labeling before adding to file sharing registry of content items (songs)

6. Update a listing of name—ID mapping, increment registry in real time

7. Mark file with user's ID during a download, then if user attempts to add to a file sharing system, the system knows the user and informs them how the user can and cannot use the file; e.g., refuse registration 8. Distinguish level of service in subscription service by watermark label (see, e.g., U.S. Pat. No. 7,689,532)

9. check integrity of file: free of content bombs and viruses (see, e.g., U.S. Pat. No. 7,689,532)

10. Use time stamp to control changing of rights over time (see, e.g., application 60/232,163).

11. During transfer of a content object (e.g., by streaming or file transfer), a fingerprint or meta-tag obtained from the object can be parsed from the in-transfer object and used as an ID to access a database record. The database record can contain pre-existing information that can be read by the client device (e.g., to ascertain permitted usage rights). Or the database record can be written, e.g., with the date, time, username, etc., relating to the transfer.

12. Audio excerpts (e.g., individual MP3 frames) can be hashed (e.g., yielding 16 bits). This hash code can be used to modulate bits—making it more difficult to change the audio.

Specific Example Utilization

In this specific example utilization, it is assumed that the embedded data has been added and dynamically locked (including being modified by the audio content and encrypted, as defined in U.S. Pat. No. 7,055,034, already incorporated by reference) to the audio throughout the frames in all legitimate MP3 files at the time of creation. (Note that the embedded data could include an ID to identify the content and/or artist, such as could be created from CDDB's database, available at http://www.cddb.com, and incorporated by reference, but not included in this example.) For personal use, this may happen at the ripping stage, i.e. when content on an optical disk like a CD is converted into a MP3 file. For retail use, this may happen when the file is made available for sale, probably through a commercial ripper. This can also happen during the file transfer in the file sharing system. The identity of the file can be determined from its ID3 song title tag or digital fingerprint, defined as a hash of some or all of the digital audio file. The song title or fingerprint can be used to connect to a secondary database to locate the ID for that song. In this design, the ID embedded in a song is the same for each user.

When a user enables a file sharing system (e.g., an enhanced version of the Napster file sharing system) to share a directory on his computer, client software on the user's computer searches for all MP3 audio files in locations (i.e. folders or directories) allowed by the user. For each audio file, the client software looks for embedded data placed throughout the frame headers of the MP3 file. The embedded data provides data that the file is allowed to be shared and is continuous from start to end. Since the embedded data is dynamically locked to the audio, thus extremely difficult to duplicate, it is presumed that no viruses or audio bombs have been substituted. Now, the client software establishes a connection with a central database, and transfers to the central database the artist and song title of each song due to its ID3 tags, that the file can be shared, and that it is a "safe" file. (Note that the artist and song title can be identified by the embedded data ID and a secondary database, as discussed above, but not implemented in this example.) In addition, if no embedded data exists, it is up to the application to decide whether to allow file sharing. The application would not want to display a "safe" icon.

Next, when the user is connected to the file sharing system, the central database activates his songs (e.g., adds them to the connected file registry 100). If someone else's search locates this user's songs, they can download the songs from his computer and know they have rights and that the song is "safe" by some identifying feature displayed in the UI of the client software, such as a "safe" icon.

However, if a user wants to foil the system, he may have tried to replace the file with a file of the same size and name. In this case, the client software can do any or all of the following to improve its reliability. The uploading side client software may want to verify that the embedded data still exists and is complete before allowing uploading. Or, the requesting/downloading client software may ask the uploading client software for the embedded data. This uploading-side security and client-to-client exchange is more difficult to trick since it involves changing object code of the client software, but not impossible since the exchange includes using software available on the computer of the person desiring to sabotage the system. In addition, the requesting/downloading client application may want to check the embedded data while the file is downloaded. Bypassing this last downloading-side security feature is the most difficult since it happens on a computer not available to the person desiring to sabotage the system and the embedded data is secure.

In an alternative example, the embedded data could be a watermark placed in the original CD or DVD audio, and which survives compression and is used in other copy management systems, such as designed by DVD-A and the Secure Digital Music Initiative (SDMI). In this case, the enabling and usage of the file-sharing system would be similar. It is mainly the embedding process that is different.

Using the Embedded Data to Link to Additional Information or Actions

In addition to the roles of the embedded data described above, the embedded data may also be used to link additional information or actions to a file. For example, the embedded data may carry an address or an index to an address of additional information or a program related to the file. The embedded data may trigger the decoding application to fetch the additional information or execute the linked action automatically. Alternatively, the decoding application may present a user interface to the user, giving the user the option to instruct the computer to fetch additional information or launch a program associated with the file via the embedded data.

The additional information may be rendered to the screen (e.g., a web page, graphical image, video) or rendered to an audio output device (e.g., a sound clip). The additional information may represent a graphical brand identifier, copyright notice, web page or link to a web page, etc. Visual information or program instructions linked to a file may be used to create a user interface that controls how the user interacts with the file. The user interface may include graphical icons that act as hot links to web pages or programs, user interface controls that enable the user to control rendering or transfer of the file from which the embedded data was extracted. For example for a music file, the user interface controls could enable the user to control playback of the file. These user interface controls may create a unique user interface for each file or customize a media player, such as Windows Media Player, Real Player from Real Networks, WinAmp from America OnLine, for that file.

In one usage scenario, the client system extracts this embedded data and presents a user interface to the user asking him if he wants additional information about the file. In the case of a music file, the client system could display a link to additional information or a related action as the music file is being transferred or rendered. Specifically, the embedded data could be used as an index to a URL of a web site that provides more information or opportunities to buy the music or related products or services via an electronic transaction.

A database mapping embedded data to additional information or actions could be stored in the client system, a remote computer or device connected via a network, or a combination of both. The client system may be programmed to automatically look up corresponding information or actions in response to decoding the embedded data. The information or actions in this case may include displaying a user interface with links to additional information, programs, etc. (e.g., links to web sites, or programs that execute when the user selects the link). Alternatively, it may include fetching related information or programs that is rendered or executed automatically while the file is being transferred or rendered. For example, the embedded data in a music file might link to video or image data that is rendered as the music is being rendered. Also, the embedded data might also link to a web site where the user can buy the content, license usage rights in the content, or buy or purchase related content, products or services. For more information about these types of applications see U.S. Pat. Nos. 6,505,160 and 6,947,571, and pending application Ser. No. 09/574,726, filed May 18, 2000, which are hereby incorporated by reference.

Using Fingerprints to Enhance Searching and Tracking of Files

Just as embedded data enhances file sharing systems, fingerprints can also provide additional functionality. Fingerprints refer to unique identifiers that are derived from the content of the file. For example, a fingerprint can be computed from an audio, image or video signal stored in a file by hashing the data representing that signal into a unique identifier. The data that is used may be part or all of the file, desirably using an initial segment, and can the perceptually relevant data of the file, such as frequency components of an audio file that have large magnitudes. The unique identifiers for files are stored in a database that associates information, and in some cases, automated actions, with the unique identifiers. Such fingerprint technology is currently used to identify audio and video signals for broadcast monitoring applications, and can be used for applications described in this document.

Fingerprints may be computed for media files, like image, audio, and video files, and stored in a database along with information or actions associated with the files. This database enables files to be associated with related information or actions as described in the previous section.

For example, file sharing software executing on the client computes the fingerprint for a file recently received or sent in the file sharing system. As part of the file sharing process, the file sharing software computes the fingerprint and sends it to a database system, which is located at a central server or distributed in the file sharing network. In response, the database system returns related information, or performs an action related to the fingerprint, such as logging an event, linking to another computer (e.g., a web site that returns information to the sending or receiving computer, a licensing server that sends a web page to the sending or receiving computer with licensing information or usage control rules), streaming a media signal (e.g., streaming audio or video) to the sending or receiving computer, etc.

The fingerprint augments file searching and tracking in the system because files can be searched or tracked based on their fingerprint. For example, the user could instruct the file sharing system to return a list of related files to a file in question. In response, the file sharing software computes a fingerprint of the file in question, sends it to a search engine, which in turn, returns a list of files and related information linked to that fingerprint in a database. Also, to track usage or transfer of a file, the file sharing system can log the fingerprint of a file when it is transferred or used as described previously.

The fingerprint is computationally expensive to calculate each time in some cases. The fingerprint ID can be stored in the file sharing database so it only needs to be calculated once. This fingerprint ID is then associated with the media file from which is was calculated, such as by associating it with an identifier for the file. However, this method of storage is not tightly locked to the file, and, thus, allows people to create content bombs within files, or swap them under false names.

As such, a method of embedding the fingerprint data in the header can be used to improve the efficiency of the fingerprinting method. Similarly, the method of embedding the watermark ID in the header can be used to improve the efficiency of the watermark method. This method allows header data to be efficiently checked for the ID before calculating the fingerprint or detecting the watermark.

In addition, this ID can be embedded in the header when the watermark is embedded or when it is read, or when the fingerprint is calculated, preferably the first time calculating the fingerprint. The embedding can provide reliability and digital receipts if it is embedded throughout the frames, possibly using the MPEG standard copyright bit, and locked to the content and encrypted, as discussed previously.

Time Stamped Watermark

By including the creation or release date of the content to its watermark or embedded data (defined as time stamped watermark), the content's usage can be controlled over time.

In file sharing communities, a song or movie with a time stamped watermark can enter different areas of the file sharing operation dependent upon the current date. The current date can come from the local clock, which is easy to change, or a central clock on a secure server, which is difficult to change. In simplest form, the file is not allowed to be shared for one month after its release and is allowed to be shared after that. This allows the record labels to capitalize on different market segments at different times, just as the movie industry does with VHS and DVD releases occurring a month or so after the theatre release.

Alternatively, the file could propagate through the file sharing network over time, starting in the premium section, then moving to the basic section, possibly one month later, and finally entering the year section, possibly one year later.

In reference to digital asset management systems, the time stamped watermark could be used to find the most recent version of the file. For example, if Ford wanted to use the most recent image of its F150 truck, it could compare the embedded date of the current picture to that of the latest entry into its digital asset management system to find the most recent version.

More File Sharing Enhancements

This section describes a number of additional enhancements for file sharing systems, including 1. Using different beginning and ending frame payloads to determine a successful download of a multimedia file (e.g., an audio or video file), or using a header indicating the number of frames in the media signal so that the receiver can check whether the received frames matches the number indicated in the header.

2. Stream compressed audio or video file from a distributing server to a user's client computer when the user does not have usage rights for that file to enable the user to preview the audio or video file. This system only requires server side security to keep the file from being tampered with, and server side security is easier to implement.

3. Hash audio in each frame to two or more bytes and use the hash to modulate bits of the auxiliary data because it makes it more difficult to change the audio signal while maintaining a predetermined relationship between the audio data and the auxiliary data that has been modulated with a hash of the audio data. This method applies to auxiliary data for video files as well.

4. Choose frames or data within frames randomly used to modify the auxiliary data, based upon a PN sequence to make it more difficult to change the host audio or video signal of the auxiliary data.

5. Branding the label by displaying the label's name and/or logo while searching and/or downloading the file by determining the content provider from the embedded unique ID or content owner section.

6. Linking back to the retailer where the music was originally bought via a transaction watermark or embedded data containing the retailer's ID.

7. Automatically generating the embedded ID using a hash of the CD table of contents (TOC) and/or track, with the TOC hash possibly matching that of CDDB.

Time Codes in Video and Audio Watermark Payloads

For a number of applications, it is useful to embed time or sequence codes in video and audio watermarks. Preferably, these codes are embedded in a sequence of frames that comprise the video or audio stream of interest. One way to implement the code is to increment the code for each frame or group of neighboring frames in the time dimension, starting from the beginning of the video or audio clip, and continuing to the end of a portion to be marked. Another way is to embed a code indicating the number of frames between succeeding watermark payloads. These codes enable later authentication of the video or audio stream by extracting the digital watermark from each frame or group of frames, and then checking to determine whether the extracted codes are complete and in the same order as at the time of embedding. Alternatively, codes indicating the number of frames between embedded watermarks are used to check the number of received frames relative to the number of frames indicated by the watermark payload code. These codes enable the receiver to authenticate the stream and determine which portions, if any, are missing or have been altered.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant incorporates by reference the patents and patent applications referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device). Additionally, content encoded with auxiliary data used in file sharing may be distributed on packaged media, such as optical disks, flash memory cards, magnetic storage devices, or distributed in an electronic file format.

The particular combinations of elements and features in the above-detailed embodiments are exemplary only; the interchanging and substitution of these teachings with other teachings in this and the incorporated-by-reference patents/applications are also contemplated.

The invention claimed is:

1. A method of authenticating a media signal file using auxiliary embedded data hidden in the file, the method comprising:

extracting, using a computing device, time codes from auxiliary data hidden in a media signal file, wherein the time codes indicate a number of frames between selected time frames in the media signal file and enable verification that the number of frames are present in the media signal file; and determining, using the computing device, whether the extracted time codes in the media signal file are complete.

2. The method of claim 1, wherein the media signal file comprises a video file.

3. The method of claim 1, wherein the media signal file comprises an audio file.

4. The method of claim 1, wherein the auxiliary data comprises a hidden digital watermark imperceptibly embedded by altering data samples of a video or audio signal in the media signal file.

5. The method of claim 1, wherein the time codes are embedded in an ordered time sequence in frames within the media signal.

6. The method of claim 5, wherein the time codes are extracted and an order of the extracted time codes is analyzed to determine whether the media signal file has been tampered with.

7. A non-transitory computer readable medium on which is stored instructions that, when executed by a computing device, perform operations comprising:
- extracting time codes from auxiliary data hidden in a media signal file, wherein the time codes indicate a number of frames between selected time frames in the media signal file and enable verification that the number of frames are present in the media signal file; and
- determining whether the extracted time codes in the media signal file are complete.

8. A system comprising:
- a computing device configured to extract time codes from auxiliary data hidden in a media signal file, wherein the time codes indicate a number of frames between selected time frames in the media signal file and enable verification that the number of frames are present in the media signal file;
- wherein the computing device is further configured to determine whether the extracted time codes in the media signal file are complete.

9. The system of claim 8, wherein the media signal file comprises a video file.

10. The system of claim 8, wherein the media signal file comprises an audio file.

11. The system of claim 8, wherein the auxiliary data comprises a hidden digital watermark imperceptibly embedded by altering data samples of a video or audio signal in the media signal file.

12. The system of claim 8, wherein the time codes are embedded in an ordered time sequence in frames within the media signal.

13. The system of claim 8, wherein the computing device is configured to extract time codes and analyze an order of the extracted time codes to determine whether the media signal file has been tampered with.

\* \* \* \* \*

UNITED STATES PATENT AND TRADEMARK OFFICE
CERTIFICATE OF CORRECTION

| | | |
|---|---|---|
| PATENT NO. | : 8,126,918 B2 | Page 1 of 1 |
| APPLICATION NO. | : 12/835535 | |
| DATED | : February 28, 2012 | |
| INVENTOR(S) | : Levy | |

It is certified that error appears in the above-identified patent and that said Letters Patent is hereby corrected as shown below:

Title page, item (73), under "Assignee", in Column 1, Line 1, delete "Digimarc Corporatiion," and insert -- Digimarc Corporation, --.

Signed and Sealed this
Fourth Day of September, 2012

David J. Kappos
*Director of the United States Patent and Trademark Office*